United States Patent [19]

Bradbury et al.

[11] Patent Number: 5,306,400

[45] Date of Patent: Apr. 26, 1994

[54] METHOD FOR THE COMBINED REMOVAL AND DESTRUCTION OF NITRATE IONS

[75] Inventors: David Bradbury, Wotton-Under-Edge; George R. Elder, Westbury-on-Severn, both of United Kingdom

[73] Assignee: Bradtec Limited, Bristol, United Kingdom

[21] Appl. No.: 839,435

[22] Filed: Feb. 24, 1992

[30] Foreign Application Priority Data

Feb. 25, 1991 [GB] United Kingdom ............... 9103851

[51] Int. Cl.[5] ......................... C25B 1/02; C25B 1/00
[52] U.S. Cl. ................................. 204/101; 204/128; 204/129; 204/149; 204/151; 204/182.4
[58] Field of Search .............. 204/128, 129, 101, 149, 204/151, 737, 182.4, 180.2

[56] References Cited

U.S. PATENT DOCUMENTS

| | | | |
|---|---|---|---|
| 3,542,657 | 11/1970 | Mindler et al. | 204/98 |
| 3,893,901 | 7/1975 | Tejeda | 204/301 |
| 4,983,267 | 1/1991 | Moeglich et al. | 204/182.4 |

FOREIGN PATENT DOCUMENTS

| | | |
|---|---|---|
| 0473087 | 3/1992 | European Pat. Off. . |
| 501431 | 1/1971 | Switzerland . |
| 776469 | 6/1957 | United Kingdom . |
| 815154 | 6/1959 | United Kingdom . |
| 857688 | 1/1961 | United Kingdom . |
| 1016040 | 1/1966 | United Kingdom . |

OTHER PUBLICATIONS

Bockris et al., *"Modern Electrochemistry,"* vol. 2, 1970: pp. 888–892 and 1306–1318.

*Primary Examiner*—Kathryn Gorgos
*Attorney, Agent, or Firm*—Watson, Cole, Grindle & Watson

[57] ABSTRACT

A method for the combined removal and destruction of nitrate ions in an electrochemical cell which includes an anode compartment containing electrolyte and an anode, a cathode compartment containing electrolyte and a cathode, and a central compartment containing an anion exchange resin, the central compartment being separated from the anode compartment and the cathode compartment by respective anion permeable membranes, includes the steps of (i) passing an aqueous solution containing nitrate ions through the anion exchange resin in the central compartment of the cell, (ii) passing an electric current through the cell in order to cause the nitrate ions captured on the anion exchange resin to migrate into the anode compartment of the cell, and (iii) destroying the nitrate ions by subjecting them to reduction and oxidation reactions to form nitrogen and oxygen or water.

Step (i) may be replaced by passing an anion exchange resin washed with nitrate ion through the central compartment of the electrochemical cell.

18 Claims, 3 Drawing Sheets

METHOD FOR THE COMBINED REMOVAL AND DESTRUCTION OF NITRATE IONS

BACKGROUND OF THE INVENTION

1. Field of the Invention

The present invention relates to a method for the combined removal and destruction of nitrate ions, and, in particular, to a method in which the removal and destruction of nitrate ions from aqueous solutions is carried out by electrochemical ion exchange.

2. The Prior Art

Nitrate is an increasingly important species in water, particularly in cases where the water is extracted for human consumption. High nitrate levels, particularly in excess of 50 ppm, in drinking water have been thought to be responsible for the incidence of "Blue Baby Syndrome", and more speculatively, for increased incidence of stomach cancer. As a result, interest is focusing on finding methods of removing nitrate from water, particularly for the treatment of potable water sources.

The leading technology at the present time for the treatment of nitrate is ion exchange. In this process, nitrate ions are removed from the water on an anion exchange resin, which is periodically regenerated with appropriate chemicals, most notably brine (sodium chloride). The removal of nitrate from the water by this process is highly efficient, but the collected nitrate finishes up in the waste solution which results from the brine regeneration process. The disposal of the waste solution may incur significant waste disposal costs or regulatory complications.

Conventional nitrate ion exchange treatment has benefitted by the advent of nitrate selective ion exchange resins (which have special functional groups e.g. quaternary ethyl ammonium). An example of such a resin is PUROLITE (Trademark) A 520, a macroporous styrene-divinylbenzene strong base anion resin.

Other technologies are also available for nitrate treatment, such as bio-denitrification, but these have not found such favor as the ion exchange treatment.

Nitrate ions are capable of being destroyed by electrochemical processes, because nitrate can be converted by oxidative and reductive processes into harmless constituents such as water, nitrogen and oxygen as described in U.S. Pat. No. 3,542,657. It is also known that anions migrate through anion-selective membranes under the influence of an electric current. The process of migrating ions through membranes into a separate compartment in which electrode reactions are taking place is termed "electrodialysis". However, the disadvantage of electrodialysis is that the percentage of unwanted ions removed on any pass through the cell is usually quite low, which leads to the requirement for recirculation, complexity of equipment and poor economics.

We have now developed a method for the combined removal and destruction of nitrate ions which combines the benefits of ion exchange and electrodialysis.

SUMMARY OF THE INVENTION

Accordingly, one aspect of the present invention provides a method for the combined removal and destruction of nitrate ions in an electrochemical cell which comprises an anode compartment containing electrolyte and an anode, a cathode compartment containing electrolyte and a cathode, and a central compartment containing an anion exchange resin, the central compartment being separated from the anode compartment and the cathode compartment by an anion permeable membrane, which method comprises the steps of (i)(a) either passing an aqueous solution containing nitrate ions through the anion exchange resin in the central compartment of the cell, or (i)(b) passing an anion exchange resin loaded with nitrate ion through the central compartment of the electrochemical cell, (ii) passing an electric current through the cell in order to cause the nitrate ions captured on the anion exchange resin to migrate into the anode compartment of the cell, and (iii) destroying the nitrate ions by subjecting them to reduction and oxidation reactions to form nitrogen and oxygen or water.

In carrying out the process of the present invention using step (i)(a), the aqueous solution containing the nitrate ions is passed through the anion exchange resin where the nitrate ions are removed from the solution. Any anion exchange resin may be used in the method of the invention, but preferably a strong base-type anion exchange resin or a nitrate-selective resin in used. An example of a strong base type anion exchange resin is AMBERLITE (Trademark) IRA-400 styrene gel resin, whilst an example of a nitrate selective resin is PUROLITE (Trademark) A520, a macroporous styrene-divinylbenzene strong base anion resin. Other anion exchange resins for use in the method of the invention are well known to those skilled in the art.

In carrying out the process of the present invention using step (i)(b), a spent ion exchange resin loaded with nitrate ions is passed through the central compartment of the electrochemical cell in a continuous manner, with the treated resin being removed from the bottom of the cell.

In step (ii) of the method of the invention, an electric current is passed through the cell in order to cause the nitrate ions which have been captured on the anion exchange resin to migrate into the anode compartment of the cell by electrodialysis.

In step (iii) of the method of the invention, the nitrate ions in the electrolyte are destroyed by subjecting them to reduction and oxidation reactions to form nitrogen and water.

The destruction of nitrate is believed to take place in two stages. At the cathode, the nitrate is reduced to ammonia, as stated in various literature.

$$HNO_3 + 8\ e^- + 8\ H^+ \rightarrow NH_3 + 3\ H_2O.$$

At the anode, ammonia is oxidized to nitrogen either directly,

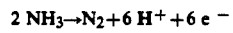

$$2\ NH_3 \rightarrow N_2 + 6\ H^+ + 6\ e^-$$

or by indirect oxidation, such as reaction with chlorine from anodic oxidation of chloride

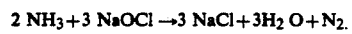

$$2\ NH_3 + 3\ NaOCl \rightarrow 3\ NaCl + 3\ H_2O + N_2.$$

It will be appreciated that the nitrate ions migrate into the anode compartment of the cell, whilst the first step in the destruction of the nitrate ions is the reduction to nitrogen or ammonia. In order to achieve this reduction, the solution containing the nitrate ions must thus be subjected to cathodic reduction. Any ammonia which is produced must be oxidized at the anode to form nitrogen according to one of the equations detailed above.

The most preferred method of operating the present invention is in relation to the treatment of an aqueous solution containing nitrate ions and the following description is specifically directed to this embodiment of the invention.

There are two main ways of operating an electrochemical cell in accordance with the method of the invention and these will be referred to as "on-line" and "off-line". During "on-line" operation, the aqueous solution containing nitrate ions flows through the central compartment of the electrolytic cell, and an electric current flows between the anode and the cathode, which causes the nitrate ions collected on the anion exchange resin to migrate through the anion permeable membrane into the anode compartment. The electrolyte in the anode and cathode compartments is preferably recirculated so that the collected nitrate is then subject to the reduction and oxidation reactions detailed above until the nitrogen escapes in the form of a gaseous product. Other anions in the water collect in the anode and cathode compartments and build up to the point where they are in chemical balance. An alternative to recirculating the anode and cathode compartment solutions is to place an auxiliary cathode in the anode compartment. This auxiliary cathode effects the first stage reduction of the nitrate ions which migrate into the anode compartment by electrodialysis and the ammonia so produced is then subjected to anodic oxidation to form nitrogen.

Efficient reduction may be achieved by the passage of the solution along a tortuous path through one or more bipolar cells, for example as described in U.S. Pat. No. 3,542,657. A cell for such reduction can be placed in the recirculating anode solution or in a system which recirculates the anolyte and the catholyte. An important advantage of the present invention is that whatever the chemistry of the influent water which requires treatment, the chemistry of the solution in which nitrate reduction is occurring may be kept alkaline, thereby increasing the efficiency of the nitrate reduction process.

In the "off-line" manner of carrying out the method of the present invention, which is particularly suitable to conditions in which the nitrate contamination of the aqueous solution is at a low concentration, the nitrate is collected during a loading cycle in which the aqueous solution passes through the central compartment of the electrolytic cell without the passage of electric current Subsequently, the nitrate is removed in a regeneration cycle in which no aqueous solution passes through the central compartment of the cell but an electric current is passed through the cell in order to cause the collected nitrate ions to migrate from the anion exchange resin into the anode compartment of the cell. The destruction of the nitrate ion is effected in the manner as previously described.

The main advantage of the method of the present invention is that it produces no waste requiring disposal. Furthermore, the "on-line" system requires less operator attention than a batch treatment technology and, because there is no build-up of nitrate in the system, there is no possibility of an elution band due to maloperation, which in conventional systems can lead to nitrate levels in the outlet water massively exceeding the input nitrate levels for a period of time.

An important use for this invention is the treatment of regenerant solutions from conventional ion exchange treatment. In this application, a conventional anion exchange resin is used to treat the raw water, and when fully loaded with nitrate ions the resin is regenerated, for example with brine or sodium bicarbonate. The regenerant solution is then treated by the process of the present invention to remove and destroy nitrate. The regenerant is then recycled for further regeneration duty.

Another application of the process is the direct treatment of nitrate-loaded ion exchange resin. In this application, the ion exchange resin, rather than an aqueous solution, passes through the central compartment of the electrochemical cell. The regenerated resin is then recovered from the bottom outlet of the cell.

The electrochemical cell used in the present invention may be fabricated according to techniques well known in the art. The cathode may be any material which is a good cathode material for the reduction of nitrogen, such as copper, stainless steel or nickel. The anode may be a precious metal such as platinum or a more standard anode such as ruthenium dioxide coated titanium.

Any anion permeable membrane may be used to separate the central compartment containing the anion exchange membrane from the cathode and anode compartments of the cell. The anion exchange membrane is preferably a fluorocarbon anion exchange membrane such as that which is available from Tosoh Corporation of Japan under the name TOSFLEX (Trademark).

BRIEF DESCRIPTION OF THE DRAWINGS

The present invention will be further described with reference to FIGS. 1 and 2 of the accompanying drawings, in which.

DETAILED DESCRIPTION OF THE PREFERRED EMBODIMENTS

Figure 1:
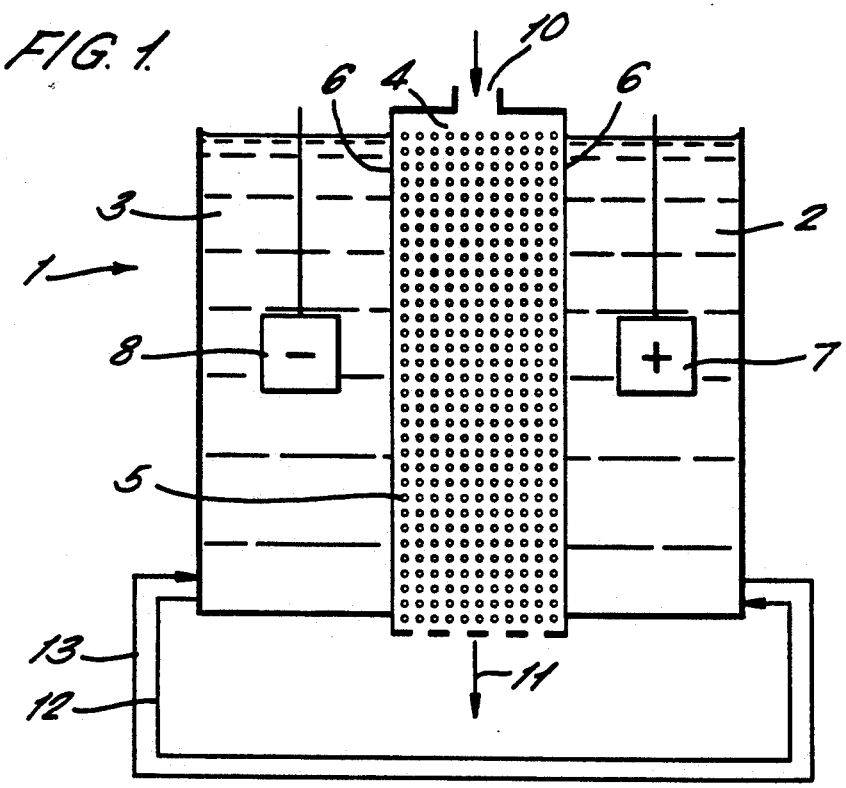
FIG. 1 illustrates one version of a nitrate treatment cell for use in the method of the invention.

Referring to the drawings, where like parts will be referred to by the same reference numerals, an electrochemical cell is generally illustrated at 1. The electrochemical cell comprises an anode compartment 2, a cathode compartment 3 and a central compartment 4. The central compartment 4 is filled with an anionic exchange resin 5 and separated from the anode and cathode compartments by an anion permeable membrane 6. An anode 7 is positioned in the anode compartment and a cathode 8 in the cathode compartment.

The aqueous solution containing the nitrate ions which is to be treated is fed to the central compartment containing the anion exchange membrane via an inlet 10. Alternatively, an anion exchange resin loaded with nitrate, as may be fed into the central compartment via inlet 10. The treated solution or treated anion exchange resin exits via the bottom of the central compartment as shown at 11.

Referring to FIG. 1, the electrolyte in the cathode compartment and the electrolyte in the anode compartment are recirculated, a recirculation pipe 12 taking electrolyte from the cathode compartment to the anode compartment and a recirculation pipe 13 taking electrolyte from the anode compartment to the cathode compartment. In this manner, the nitrate ions are subjected to electrolytic reduction at the cathode to convert the nitrate into ammonia and then to electrolytic oxidation at the anode in order to convert the ammonia into nitrogen. The full reaction schemes are detailed hereinbefore.

Figure 2:
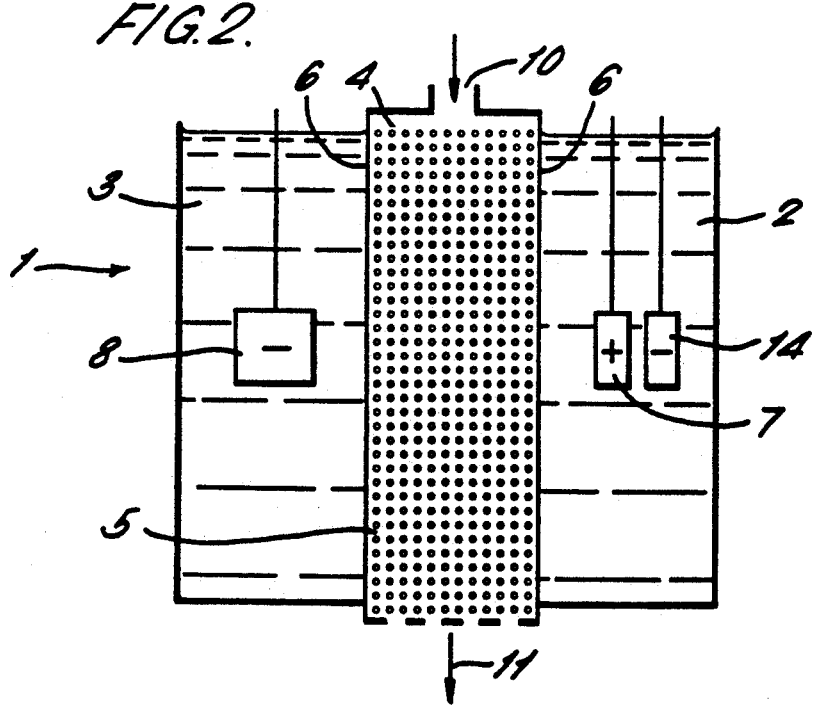
FIG. 2 illustrates another version of a nitrate treatment cell for use in the method of the invention.

Referring to FIG. 2, there is no recirculation of the electrolyte. In the embodiment as shown in FIG. 2, an auxiliary cathode 14 is positioned in the anode compartment. The auxiliary cathode is thus able to effect the electrolytic reduction of the nitrate ion, whilst the anode effects the oxidation of the ammonia produced in the reduction reaction to form nitrogen.

Figure 3:
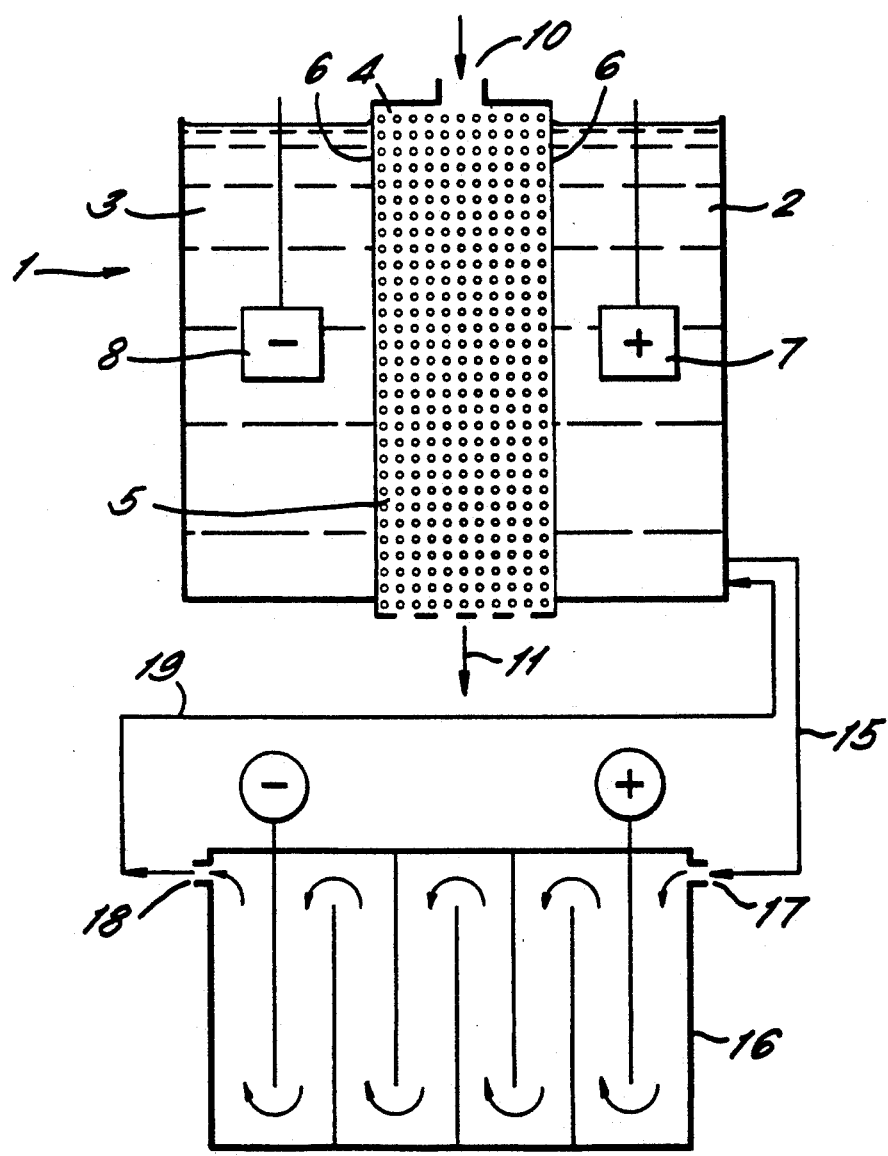
FIG. 3 illustrates a nitrate treatment cell with a tortuous path for reduction of the nitrate ions.

Referring to FIG. 3, the electrolyte from the anode compartment is passed via line 15 into a bipolar cell 16 through inlet 17. The anolyte is then caused to travel along the tortuous path as indicated by the arrows and exits via outlet 18. The anolyte is then recirculated to the anode compartment of the cell via line 19.

Figure 4:
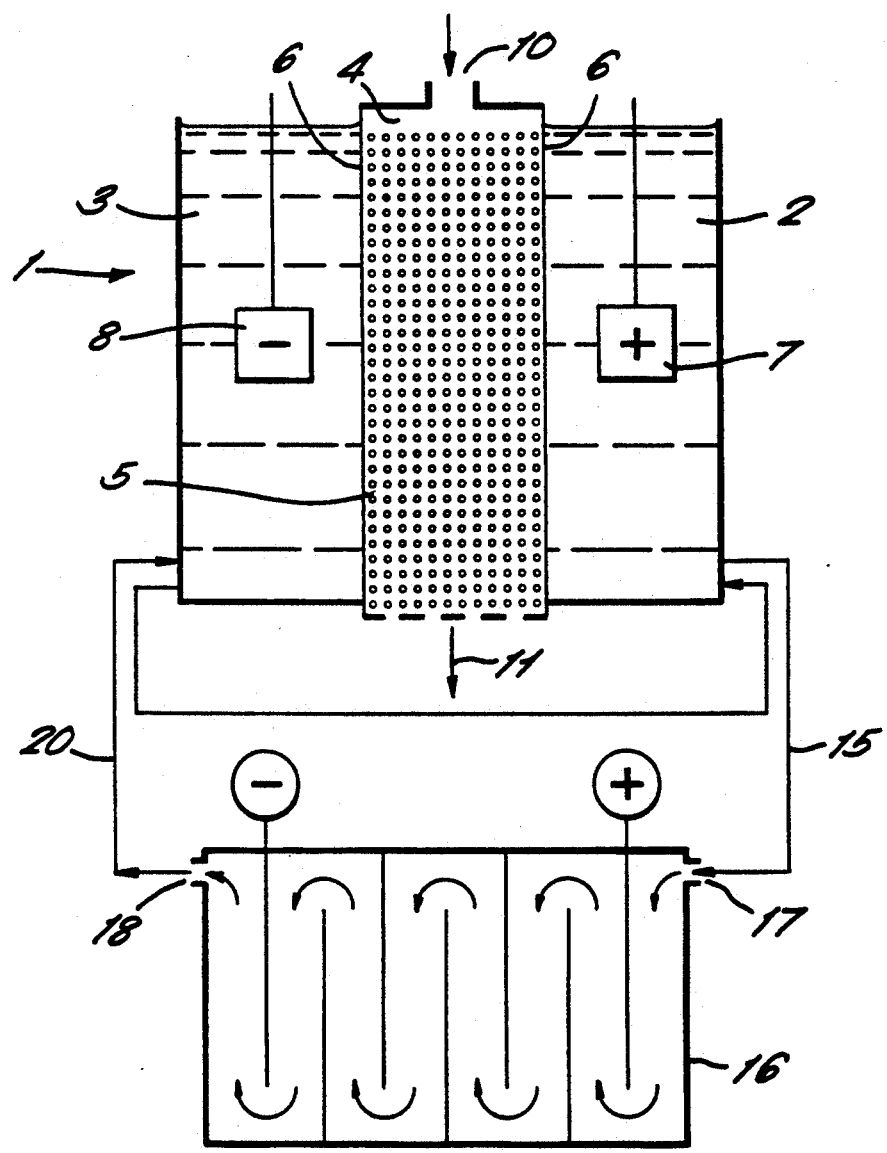
FIG. 4 illustrates a modified version of the cell of FIG. 3.

Referring to FIG. 4, the electrolyte from the anode compartment is passed via line 15 into a bipolar cell 16 through inlet 17. The electrolyte is then caused to travel along the tortuous path as indicated by the arrows and exits via outlet 18. The electrolyte is returned to the cathode compartment 3 of the cell via line 20. There is additionally a recirculation of electrolyte from the cathode compartment 3 of the cell to the anode compartment 2 of the cell via line 21.

The present invention will be further described with reference to the following non-limiting examples.

EXAMPLE 1

The anode and cathode compartments of a cell as illustrated in FIG. 1 were filled with 1M sodium carbonate/bicarbonate buffer solution adjusted to a pH of 8.4 to 8.9.

The central compartment of the cell contained 40 ml of an anion exchange resin (AMBERLITE (Trademark) IRA-400 styrene gel resin) having 0.875 meq/ml measured capacity for nitrate. Repeated use of this resin had reduced the capacity slightly below the manufacturer's stated value (about 1 meq/ml). Sodium nitrate solution (10.4 litres, 0.01M) was passed through the central compartment of the cell at 650 ml/h. A current of 1.2 A was passed through the cell during the experiment (about 16 hours) with recirculation of the anode and cathode compartment solutions. Analysis of the fractions was by ion chromatography and selective ion electrode. The analysis was as follows:

|  | Nitrate Present (mg) |
| --- | --- |
| Total Input (10.4 × 0.01 × 62,000) | 6,448 |
| (Resin Capacity for Nitrate) | 2,170 |
| Lost in Outlet from Central Compartment | 508 |
| Present finally in Cathode and Anode Compartment | 3,585 |
| Left on Resin at the end of experiment | 1,948 |
| Destroyed | 407 |

The resin removed 2.73 times its chemical capacity for nitrate in this experiment.

The nitrate was not extensively destroyed in this experiment because the cell was not optimized for destruction, and this also compromised efficiency because nitrate ions could pass out of the cathode compartment back into the resin.

In a separate experiment to measure nitrate destruction, a cathode was placed in one half of a cell divided by a cation permeable membrane (to simulate the conditions in the cathode compartment, but to prevent escape of the nitrate), and a solution of sodium hydroxide and sodium nitrate (0.1M each) placed in the cathode compartment. The solution was electrolyzed at 7 amps current for 1.5 hours. Analysis revealed that about two thirds of the nitrate had disappeared, and ammonia was detected in the final solution.

EXAMPLE 2

The central compartment of a cell as described in Example 1 was loaded with 62 ml PUROLITE (Trademark) A 520, a macroporous styrene-divinylbenzene strong base anion resin nitrate selective resin in place of the AMBERLITE (Trademark) IRA-400 styrene gel resin. The Purolite resin and a stated capacity for nitrate of 1.0 meq/ml. A loading solution of 10 liters 0.01M sodium nitrate was passed through the resin at 1.2 L per hour. During loading, the resin removed its full capacity or nitrate. After loading, the resin was regenerated with 1.1 A current for 4.5 hours using a sodium carbonate/bicarbonate buffer in the anode and cathode compartments as described in Example 1. There was no mixing of cathode and anode solutions in this experiment and, hence, no nitrate destruction. The analysis was as follows:

|  | Nitrate Present (mg) |
| --- | --- |
| Total Input (10 × 0.01 × 62,000) | 6,200 |
| (Resin Capacity for Nitrate) | 3,844 |
| Output from central compartment (first 5L) | 155 |
| Output from central compartment (second 5L) | 2,657 |
| Present in Anode Compartment after regeneration | 3,550 |
| Left on Resin | None Detectable |

In this experiment, therefore, the resin took up close to its full capacity of nitrate in the loading phase, and during the regeneration phase the nitrate passed nearly quantitatively through to the anode compartment.

We claim:

1. Method for the combined removal and destruction of nitrate ions in an electrochemical cell which comprises an anode compartment containing electrolyte and an anode, a cathode compartment containing electrolyte and a cathode, and a central compartment containing an anion exchange resin, the central compartment is separated from the anode compartment and the cathode compartment by respective permeable membranes, which method consists essentially of the steps of
    (i) passing an aqueous solution containing nitrate ions through the anion exchange resin in the central compartment of the cell to capture the nitrate ions onto the ion exchange resin,
    (ii) passing an electric current through the cell in order to cause the nitrate ions captured on the anion exchange resin to migrate into the anode compartment of the cell, and
    (iii) destroying the nitrate ions by subjecting them to reduction by cathodic reduction means either inside or outside said anode compartment and if necessary to oxidation by anodic oxidation means to form nitrogen and oxygen or water.

2. Method as claimed in claim 1 wherein steps (i) (i) and (ii) occur simultaneously.

3. Method as claimed in claim 1 wherein steps (i) and (ii) occur sequentially.

4. Method according to claim 1 including the step of recirculating the electrolyte in the anode compartment and the electrolyte in the cathode compartment in order to cause the nitrate ions to be subjected to reduction and oxidation reactions.

5. Method according to claim 1 wherein an auxiliary cathode is included in the anode compartment in order to cause the cathodic reduction of the nitrate ions.

6. Method according to claim 1 wherein the reduction of the nitrate ions is effected by passing the electrolyte containing the nitrate ions through a bipolar cell.

7. Method according to claim 1 wherein the aqueous solution treated is water for drinking.

8. Method according to claim 1 wherein the aqueous solution treated is the regenerant solution from an ion exchange resin.

9. Method according to claim 1 wherein the cathode is made from a material selected from the group consisting of copper and stainless steel.

10. Method according to claim 1 wherein the anode is made from a material selected from the group consisting of platinum and ruthenium dioxide coated titanium.

11. Method for the combined removal and destruction of nitrate ions in an electrochemical cell which comprises an anode compartment containing electrolyte and an anode, a cathode compartment containing electrolyte and a cathode, and a central compartment containing an anion exchange resin, the central compartment is separated from the anode compartment and the cathode compartment by respective anion permeable membranes, which method consists essentially of the steps of (i) passing an anion exchange resin loaded with nitrate ion through the central compartment of the electrochemical cell, (ii) passing an electric current through the cell in order to cause the nitrate ions loaded with the anion exchange resin to migrate into the anode compartment of the cell, and (iii) destroying the nitrate ions by subjecting them to reduction by cathodic reduction means either inside or outside said anode compartment and if necessary to oxidation by anodic oxidation means to form nitrogen and oxygen or water.

12. A method according to claim 11 wherein steps (i) and (ii) occur simultaneously.

13. A method according to claim 11 wherein steps (i) and (ii) occur sequentially.

14. Method according to claim 11 including the step of recirculating the electrolyte in the anode compartment and the electrolyte in the cathode compartment in order to cause the nitrate ions to be subjected to reduction and oxidation reactions.

15. Method according to claim 11 wherein an auxiliary cathode is included in the anode compartment in order to cause the cathodic reduction of the nitrate ions.

16. Method according to claim 11 wherein the reduction of the nitrate ions is effected by passing the electrolyte containing the nitrate ions through a bipolar cell.

17. Method according to claim 11 wherein the cathode is made from a material selected from the group consisting of copper and stainless steel.

18. Method according to claim 11 wherein the anode is made from a material selected from the group consisting of platinum and ruthenium dioxide coated titanium.

* * * * *